(12) United States Patent
Louzon et al.

(10) Patent No.: US 6,435,724 B1
(45) Date of Patent: Aug. 20, 2002

(54) TRANSMISSION OUTPUT BEARINGS WITH INTERMEDIATE SPEEDOMETER SENSOR

(75) Inventors: Thomas Mark Louzon, Laurinburg; José Felipe Peláez, Southern Pines, both of NC (US); Kevin Michael Allen, Bartlesville, OK (US)

(73) Assignee: Rockwell International Corporation, Troy, MI (US)

( * ) Notice: Subject to any disclaimer, the term of this patent is extended or adjusted under 35 U.S.C. 154(b) by 510 days.

(21) Appl. No.: 08/903,484

(22) Filed: Jul. 30, 1997

(51) Int. Cl.[7] .............................................. F16C 19/38
(52) U.S. Cl. .................... 384/448; 475/118; 475/122; 475/123; 74/336 R; 477/84; 477/85; 477/154
(58) Field of Search ................................ 384/448, 571; 475/118, 122, 123; 74/336 R; 477/84, 85, 154

(56) References Cited

U.S. PATENT DOCUMENTS

| | | | | |
|---|---|---|---|---|
| 5,085,519 A | * | 2/1992 | Dougherty | .................. 384/488 |
| 5,293,787 A | | 3/1994 | Paul et al. | ..................... 74/572 |
| 5,494,358 A | * | 2/1996 | Dougherty | .................. 384/488 |
| 5,624,192 A | | 4/1997 | Rigaux et al. | .............. 384/448 |
| 5,816,711 A | * | 10/1998 | Gingrich | ..................... 384/488 |

FOREIGN PATENT DOCUMENTS

| | | | | |
|---|---|---|---|---|
| DE | 3814921 A1 | 11/1988 | ............. G01P/1/04 |
| DE | 3817175 A1 | 11/1989 | ........... B60R/16/02 |
| EP | 0397309 A2 | 11/1990 | ............. G01P/3/48 |

\* cited by examiner

Primary Examiner—Lenard A. Footland
(74) Attorney, Agent, or Firm—Carlson, Gaskey & Olds

(57) ABSTRACT

An output bearing assembly of a transmission includes a housing, and a pair of bearings. At least one speedometer sensor is mounted between the bearings. The arrangement allows the output bearings to be spaced axially by a relatively great distance.

21 Claims, 2 Drawing Sheets

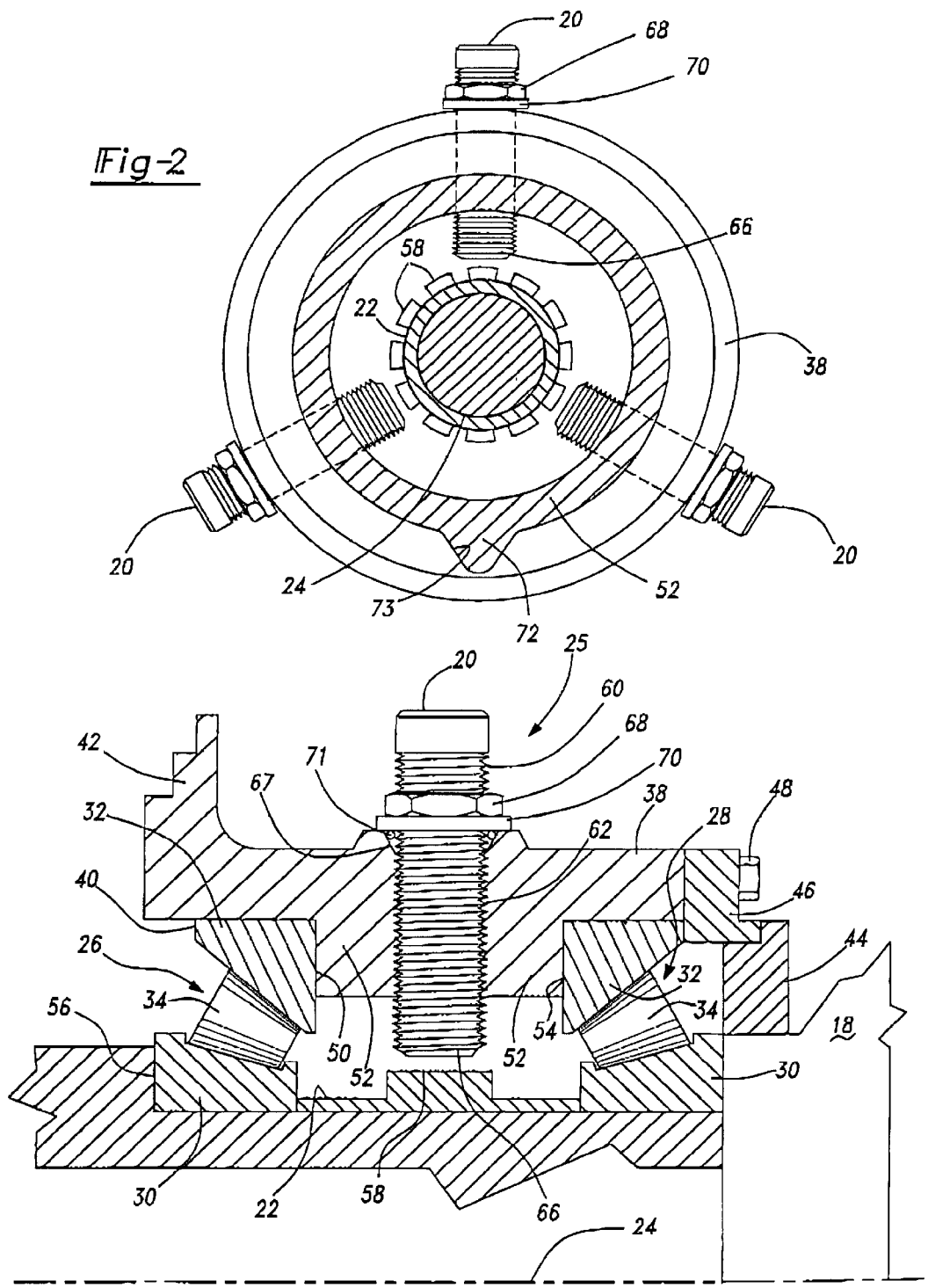

TRANSMISSION OUTPUT BEARINGS WITH INTERMEDIATE SPEEDOMETER SENSOR

BACKGROUND OF THE INVENTION

This invention generally relates to an output bearing assembly in a vehicle transmission and, more particularly, to an output bearing assembly having an intermediate speedometer sensor.

A transmission of a vehicle typically includes a main section and an auxiliary section which each contain gears to provide several speed ratios on an output shaft. An output bearing assembly mounts the output shaft beyond the auxiliary section. Typically, the output bearing assembly includes a pair of tapered output bearings supporting the output shaft relative to the housing of the auxiliary section. Part of the function of the output bearing assembly is to support and limit radial displacement of the output shaft. Space constraints typically require that the two output bearings be placed relatively close to each other. Because the bearings are in close proximity, conventional output bearings may allow undesirable radial displacements of the output shaft.

In addition, the typical transmission of a vehicle includes a speedometer rotor and a speedometer sensor both located beyond the output bearing assembly. The speedometer sensor measures the rotational speed of the speedometer rotor which is mounted on the output shaft. The sensed rotational speed is used as an indication of vehicle speed.

It would be desirable to provide an output bearing assembly which is better able to reduce radial displacement of the output shaft.

SUMMARY OF THE INVENTION

This invention provides an output bearing assembly for a vehicle transmission in which a pair of output bearings are spaced apart and at least one speedometer sensor is mounted between the two output bearings. Generally, by placing the sensor between the bearings, the bearings may be separated by a greater distance without any necessary increase in the total length of the transmission.

Preferably, an output bearing cup spacer integral with a housing of the auxiliary section spaces the bearings. In a second embodiment the output bearing cup spacer is a separate part from the housing. Both the output bearing cup spacer and the housing of the auxiliary section are spaced radially about an output shaft.

The bearings are preferably tapered roller bearings. The output bearing cup spacer is positioned between outer races of the output bearings and a speedometer rotor is mounted around the output shaft between inner races of the output bearings. Most preferably, the spacer extends radially inwardly beyond an outermost surface of the outer races of the bearings.

At least one speedometer sensor is mounted with a first end extending through the bearing cup spacer and spaced adjacent to the speedometer rotor.

The speedometer sensor typically includes a set of external threads to be received in an internally threaded hole provided in the auxiliary section housing. A washer and a nut are threaded onto the speedometer sensor. The speedometer sensor is then threaded into the housing to a predetermined depth and then the nut and washer are tightened against the housing to lock the speeedometer sensor in place. The speedometer sensor is capable of detecting the rotational speed of the speedometer rotor and to thereby enable the speed of the vehicle to be calculated.

The invention provides an output bearing cup spacer for separating the output bearings of the output bearing assembly in the transmission of a vehicle. This increases the distance between the output bearings such that radial displacement of the output shaft is reduced. The total length of the transmission is not increased since the space for mounting the sensor is now between the bearings.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 2 is a cross-sectional illustration taken along lines 2—2 from FIG. 1B.

FIG. 3 is a cross-sectional view of a second embodiment of the invention shown mounted on a half-view of an output shaft of a transmission.

DETAILED DESCRIPTION OF THE PREFERRED EMBODIMENT

Figure 1A:
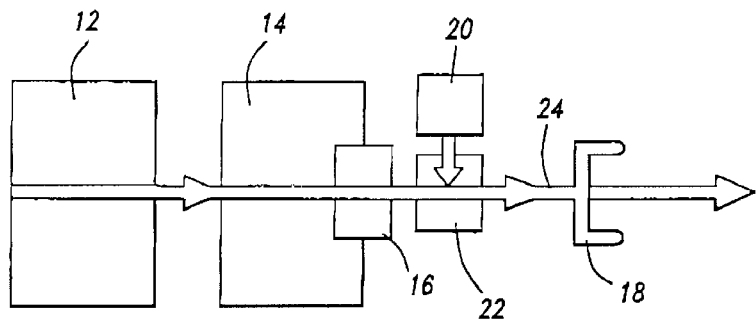
FIG. 1A is a schematic diagram illustrating the components of the prior art vehicle transmission.

FIG. 1A schematically illustrates a known vehicle transmission 10 including a main section 12, an auxiliary section 14, an output bearing assembly 16, and a yoke 18. A speedometer sensor 20 is able to detect the rotational speed of a speedometer rotor 22 mounted around an output shaft 24 which extends through the components and is fixed to the yoke 18. The speedometer sensor 20 and the speedometer rotor 22 are spaced axially beyond output bearing assembly 16 and auxiliary section 14.

Figure 1B:
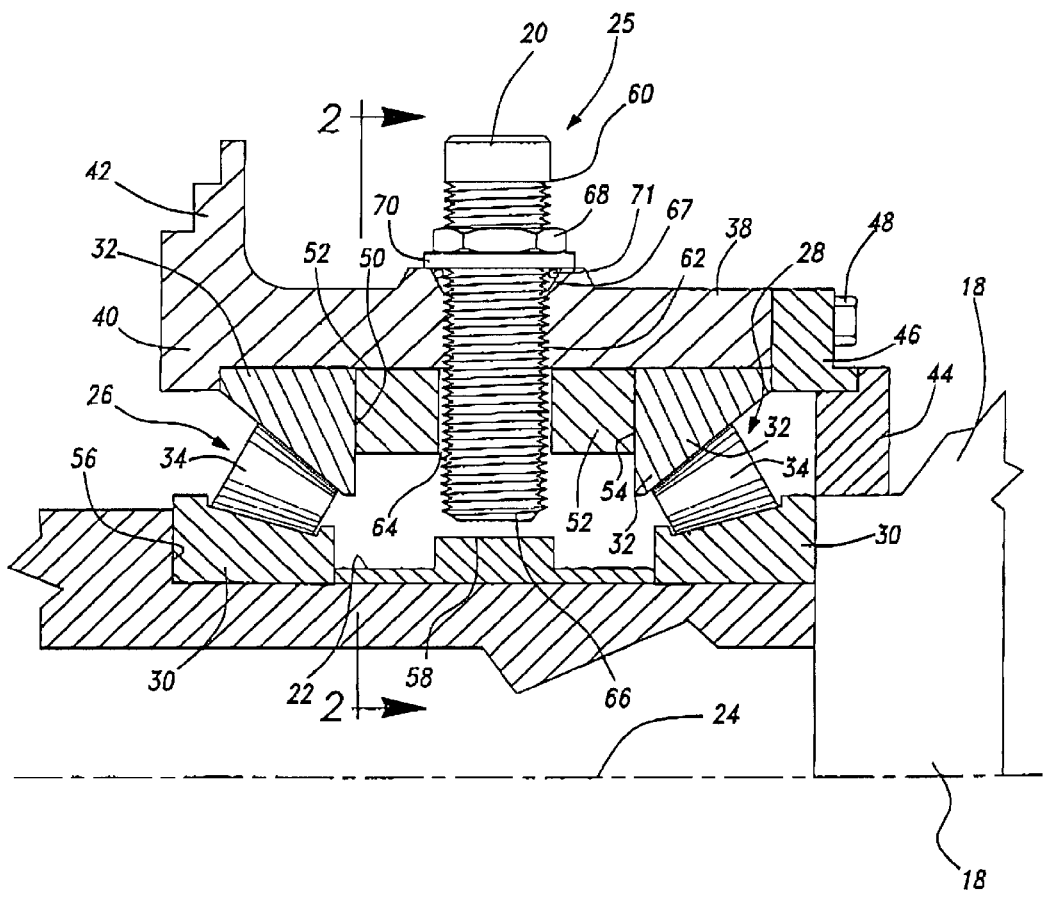
FIG. 1B is a cross-sectional view of a first embodiment of the invention shown mounted on a half-view of an output shaft of a transmission.

FIG. 1B is a cross-sectional view of a first embodiment of the invention mounted on a half-view of the output shaft 24 of the transmission 10. An output bearing assembly 25 includes a first bearing 26 and a second bearing 28. Both the bearings 26 and 28 include an inner race 30, an outer race 32, and a set of roller bearings 34 disposed between the inner race 30 and the outer race 32. Roller bearings 34 are preferably tapered roller bearings. A housing 38 having a shoulder 40 is integral with a wall 42 of the auxiliary section 14. The inner race 30 and the outer race 32 are press fitted into place on the output shaft 24 and against the housing 38 respectively. A bearing and seal retainer 46 is attached to housing 36 with a set of bolts 48. The retainer 46 supports a seal 44 for preventing oil leakage around the rotating yoke 18. The shoulder 40 in the housing 38 and a first side 50 of an output bearing cup spacer 52 position the outer race 32 of the first bearing 26. A second side 54 of the output bearing cup spacer 52 and the retainer 46 position the outer race 32 of the second bearing 28. Note, spacer 52 extends radially inwardly beyond a radially outermost extent of the outer faces 32.

In a preferred embodiment the output bearing cup spacer 52 is made of powdered metal.

The output shaft 24 has a shoulder 56 and the inner race 30 of the first bearing 26 is positioned between the shoulder 56 of the output shaft 24 and the speedometer rotor 22. The inner race 30 of the second bearing 28 is positioned between the speedometer rotor 22 and the yoke 18. A plurality of fins 58 project from the speedometer rotor 22. In the preferred embodiment there are sixteen fins 58 and the speedometer rotor 22 is made of powdered metal.

The speedometer sensor 20 has external threads 60 adapted to be received in threads 62 in the housing 38. A hole 64 in the output bearing cup spacer 52 permits a first end 66 of the speedometer sensor 20 to extend through the housing 38 and the output bearing cup spacer 52 and to be at a predetermined depth in close proximity to the speedometer rotor 22. The top of the threads 62 in the housing 38 includes a straight thread O-ring port 67 as is well known in the art. A nut 68 is threaded onto the speedometer sensor 20 and holds a washer 70 against the output bearing cup spacer 52. An O-ring 71 is enclosed in the space defined by the washer 70, the straight thread O-ring port 67, and the speedometer sensor 20. The O-ring 71 seals the speedometer sensor 20 in the housing 38. In the preferred embodiment there are three speedometer sensors 20 mounted in the housing 38. The first end 66 of each speedometer sensor 20 is spaced radially outwardly of the speedometer rotor 22 and the output shaft 24. The sensors 20 may operate as is known in the art. It is the positioning of the sensors 20 which is inventive here.

FIG. 2 is a cross-sectional illustration taken along line 2—2 in FIG. 1B; The housing 38 and the output bearing cup spacer 52 are disposed radially around the output shaft 24. The output bearing cup spacer 52 has a tab 72 which is received in a groove 73 in housing 38 to position spacer 52. The speedometer rotor 22 is mounted around the output shaft 24. In the most preferred embodiment there are three speedometer sensors 20 mounted in the housing 38.

FIG. 3 is a cross-sectional view of a preferred embodiment of the invention shown mounted on a half-view of the output shaft of the transmission. In this embodiment the output bearing cup spacer 52 is integral with the housing 38. Because the output bearing cup spacer 52 is integral with the housing 38, the shoulder 40 on the housing 38 is no longer necessary to position the outer race 32 of the first bearing 26. Instead, the design of the roller bearing 34 forces the outer race 32 of the first bearing 26 against the first side 50 of the output bearing cup spacer 52. The inner race 30 of the first bearing 26 is still positioned between the shoulder 56 of the output shaft 24 and the speedometer rotor 22. In all other respects, this embodiment is the same as that shown in FIG. 1B.

An output bearing assembly designed according to this invention offers the advantages of allowing the output bearings to be further spaced apart thereby reducing radial displacement of the output shaft of the vehicle. The assembly further provides for integration of the speedometer sensor and speedometer rotor into the assembly thus reducing the number of components in the transmission.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A transmission for a vehicle comprising:
   an output shaft extending along an axis;
   an output bearing assembly for supporting said output shaft, including a housing, an output bearing cup spacer, a pair of bearings each having an inner race and an outer race, and at least one speedometer sensor mounted within said housing, said housing and said output bearing cup spacer spaced radially from said output shaft;
   a speedometer rotor mounted on said output shaft;
   said speedometer rotor and said output bearing cup spacer disposed axially between said pair of bearings said speedometer rotor disposed between said inner races and said output bearing cup spacer disposed between said outer races; and
   said speedometer sensor extending through said housing and said output bearing cup spacer, with a first end of said speedometer sensor adjacent to said speedometer rotor and between said pair of bearings.

2. A transmission as recited in claim 1, wherein a set of external threads are formed on said speedometer sensor, a set of internal threads are formed within a hole in said housing, said speedometer sensor threaded through said hole in said housing, thereby mounting said speedometer sensor within said housing.

3. A transmission as recited in claim 2, wherein a washer is positioned on said speedometer sensor and held there by threading a nut onto said speedometer sensor.

4. A transmission as recited in claim 1, wherein said output bearing cup spacer is integral with said housing.

5. A transmission as recited in claim 1, wherein said housing is integral with an auxiliary box housing.

6. A transmission as recited in claim 1, wherein one of said output bearing cup spacer and said housing having a tab received in a groove in the other of said housing and said output bearing cup spacer for positioning said output bearing cup spacer.

7. A transmission as recited in claim 1, wherein said bearings are tapered roller bearings.

8. A transmission as recited in claim 1, wherein said speedometer rotor is made of powdered metal.

9. A transmission as recited in claim 1, wherein said speedometer rotor includes a plurality of fins.

10. A transmission as recited in claim 1, wherein said output bearing cup spacer extending radially inwardly beyond a radially outermost surface of said bearings.

11. An output bearing assembly for a vehicle transmission having
   a main section, an auxiliary section, and an output shaft comprising;
   a housing having an integral output bearing cup spacer, a pair of bearings centered about a central axis, and at least one speedometer sensor mounted in said housing;
   said output bearing cup spacer disposed between said pair of bearings; and
   said speedometer sensor mounted axially between said bearings, and extending through said housing and said output bearing cup spacer, said speedometer sensor including a set of external threads and said housing including a hole having a set of internal threads said speedometer sensor threaded through said hole in said housing, thereby mounting said speedometer sensor in said housing.

12. An output bearing assembly as recited in claim 11, wherein said output bearing cup spacer extending radially inwardly beyond a radially outermost surface of said bearings.

13. A transmission as recited in claim 11, wherein a washer is positioned on said speedometer sensor and held there by threading a nut onto said speedometer sensor.

14. An output bearing assembly as recited in claim 11, wherein said bearings are tapered roller bearings.

15. A transmission comprising:
   an output shaft extending along a central axis;
   transmission sections for changing the speed of said output shaft;

a pair of bearings mounted on said output shaft beyond said transmission sections; and a speed sensor mounted axially between said pair of bearings.

16. A transmission as recited in claim 15, wherein said sensor is mounted within a spacer, said spacer extending radially inwardly beyond a radially outermost extent of said pair of bearings.

17. A transmission for a vehicle comprising:

an output shaft extending along an axis;

an output bearing assembly for supporting said output shaft, including a housing, an output bearing cup spacer, a pair of bearings, and at least one speedometer sensor mounted within said housing, said housing and said output bearing cup spacer spaced radially from said output shaft;

said speedometer rotor and said output bearing cup spacer disposed axially between said pair of bearings; and said speedometer sensor having a set of external threads and said housing including a hole having a set of internal threads, said speedometer sensor threaded through said hole in said housing and extending through said housing and said output bearing cup spacer, thereby mounting said speedometer sensor within said housing with a first end of said speedometer sensor adjacent to said speedometer rotor and between said pair of bearings.

18. A transmission as recited in claim 17, wherein said output bearing cup spacer extending radially inwardly beyond a radial outmost surface of said bearings.

19. A transmission as recited in claim 17, wherein a washer is positioned on said speedometer sensor and held there by threading a not onto said speedometer sensor.

20. A transmission as recited in claim 17, wherein said output bearing cup spacer is integral with said housing.

21. A transmission as recited in claim 17, wherein one of said output bearing cup spacer and said housing having a tab received in a groove in the other of said housing and said output bearing cup spacer for positioning said output bearing cup spacer.

* * * * *

UNITED STATES PATENT AND TRADEMARK OFFICE
CERTIFICATE OF CORRECTION

PATENT NO. : 6,435,724 B1
DATED : August 20, 2002
INVENTOR(S) : Louzon et al.

It is certified that error appears in the above-identified patent and that said Letters Patent is hereby corrected as shown below:

Column 6,
Line 19, "not" should be -- nut --

Signed and Sealed this

Fourteenth Day of January, 2003

JAMES E. ROGAN
*Director of the United States Patent and Trademark Office*